(12) United States Patent
Vallius et al.

(10) Patent No.: US 10,962,782 B2
(45) Date of Patent: Mar. 30, 2021

(54) EXIT PUPIL EXPANSION VIA CURVED WAVEGUIDE

(71) Applicant: Microsoft Technology Licensing, LLC, Redmond, WA (US)

(72) Inventors: Tuomas Heikki Sakari Vallius, Kirkland, WA (US); Richard Andrew Wall, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/201,888

(22) Filed: Nov. 27, 2018

(65) Prior Publication Data
US 2020/0166753 A1 May 28, 2020

(51) Int. Cl.
*G02B 27/00* (2006.01)
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0035* (2013.01); *G02B 27/0081* (2013.01)

(58) Field of Classification Search
CPC ...... G02B 27/01; G02B 27/09; G02B 27/017; G02B 27/0172; G02B 27/0178; G02B 2027/011; G02B 2027/013; G02B 2027/0198; G02B 27/0081
USPC ................ 385/31, 37, 38, 129, 130; 349/11
See application file for complete search history.

(56) References Cited

U.S. PATENT DOCUMENTS

| | | | | |
|---|---|---|---|---|
| 8,456,744 | B2* | 6/2013 | Dobschal | G02B 27/143 359/630 |
| 8,810,913 | B2* | 8/2014 | Simmonds | G02B 27/0081 359/631 |
| 8,830,584 | B2* | 9/2014 | Saarikko | G02B 27/0081 359/567 |
| 9,733,475 | B1* | 8/2017 | Brown | G02B 27/1086 |
| 10,038,840 | B2 | 7/2018 | Vallius | |
| 10,228,565 | B1* | 3/2019 | Saarikko | G02B 27/0172 |
| 2010/0157400 | A1* | 6/2010 | Dimov | G02B 27/0172 359/13 |

(Continued)

FOREIGN PATENT DOCUMENTS

| | | |
|---|---|---|
| JP | 1063641 A | 1/1994 |
| WO | 2017060665 A1 | 4/2017 |

OTHER PUBLICATIONS

Zheng, PhD thesis, 1997.*

(Continued)

*Primary Examiner* — Robert RTavlykaev
(74) *Attorney, Agent, or Firm* — Alleman Hall Creasman & Tuttle LLP

(57) ABSTRACT

Examples are disclosed that relate to expanding an exit pupil of a display device via a curved waveguide. One example provides a curved waveguide, including an input coupler configured to couple light into the curved waveguide, a first reflective surface, a second reflective surface opposing the first reflective surface, and an output coupler configured to couple the light out of the curved waveguide. The curved waveguide also has a curvature in a direction transverse to an optical path between the input coupler and the output coupler, the curvature having a radius that varies along a direction extending between the input coupler and the output coupler.

20 Claims, 4 Drawing Sheets

(56) References Cited

U.S. PATENT DOCUMENTS

| | | | |
|---|---|---|---|
| 2010/0315719 A1* | 12/2010 | Saarikko | G02B 27/0101 359/630 |
| 2012/0162549 A1* | 6/2012 | Gao | G02B 27/0172 349/11 |
| 2012/0300311 A1 | 11/2012 | Simmonds et al. | |
| 2015/0062707 A1 | 3/2015 | Simmonds et al. | |
| 2015/0153573 A1* | 6/2015 | Komatsu | G02B 27/017 345/8 |
| 2015/0260916 A1* | 9/2015 | Cherchi | G02B 6/125 385/32 |
| 2016/0161755 A1* | 6/2016 | Yonekubo | G02B 27/4227 345/8 |
| 2016/0178909 A1* | 6/2016 | Komatsu | G02B 17/0848 345/8 |
| 2017/0010465 A1* | 1/2017 | Martinez | G02B 27/0172 |
| 2017/0219830 A1* | 8/2017 | Komatsu | G02B 27/0172 |
| 2017/0351025 A1* | 12/2017 | Trita | G02B 6/12011 |
| 2018/0188542 A1 | 7/2018 | Waldern et al. | |
| 2018/0231779 A1 | 8/2018 | Bohn | |
| 2018/0373046 A1* | 12/2018 | Alexander | G02B 26/105 |
| 2020/0096767 A1* | 3/2020 | Basset | G06F 3/013 |

OTHER PUBLICATIONS

"Application as Filed in U.S. Appl. No. 15/698,456", filed Sep. 7, 2017, 75 Pages.

"Application as Filed in U.S. Appl. No. 15/950,440", filed Apr. 11, 2018, 51 Pages.

"International Search Report and Written Opinion Issued in PCT Application No. PCT/US19/062086", dated Feb. 24, 2020, 10 Pages.

\* cited by examiner

EXIT PUPIL EXPANSION VIA CURVED WAVEGUIDE

BACKGROUND

A near-eye display device may utilize a waveguide to deliver an image from a light engine to a user's eye. In an augmented reality display device, a waveguide may be configured as a combiner that allows the simultaneous viewing of displayed virtual imagery delivered via the waveguide and a real-world background viewed through the waveguide.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to expanding an exit pupil of a display device via a curved waveguide. One example provides a curved waveguide including an input coupler configured to couple light into the curved waveguide, a first reflective surface, a second reflective surface opposing the first reflective surface, and an output coupler configured to couple the light out of the curved waveguide. The curved waveguide comprises a curvature in a direction transverse to an optical path between the input coupler and the output coupler, the curvature having a radius that varies along a direction extending between the input coupler and the output coupler.

DETAILED DESCRIPTION

Figure 1:
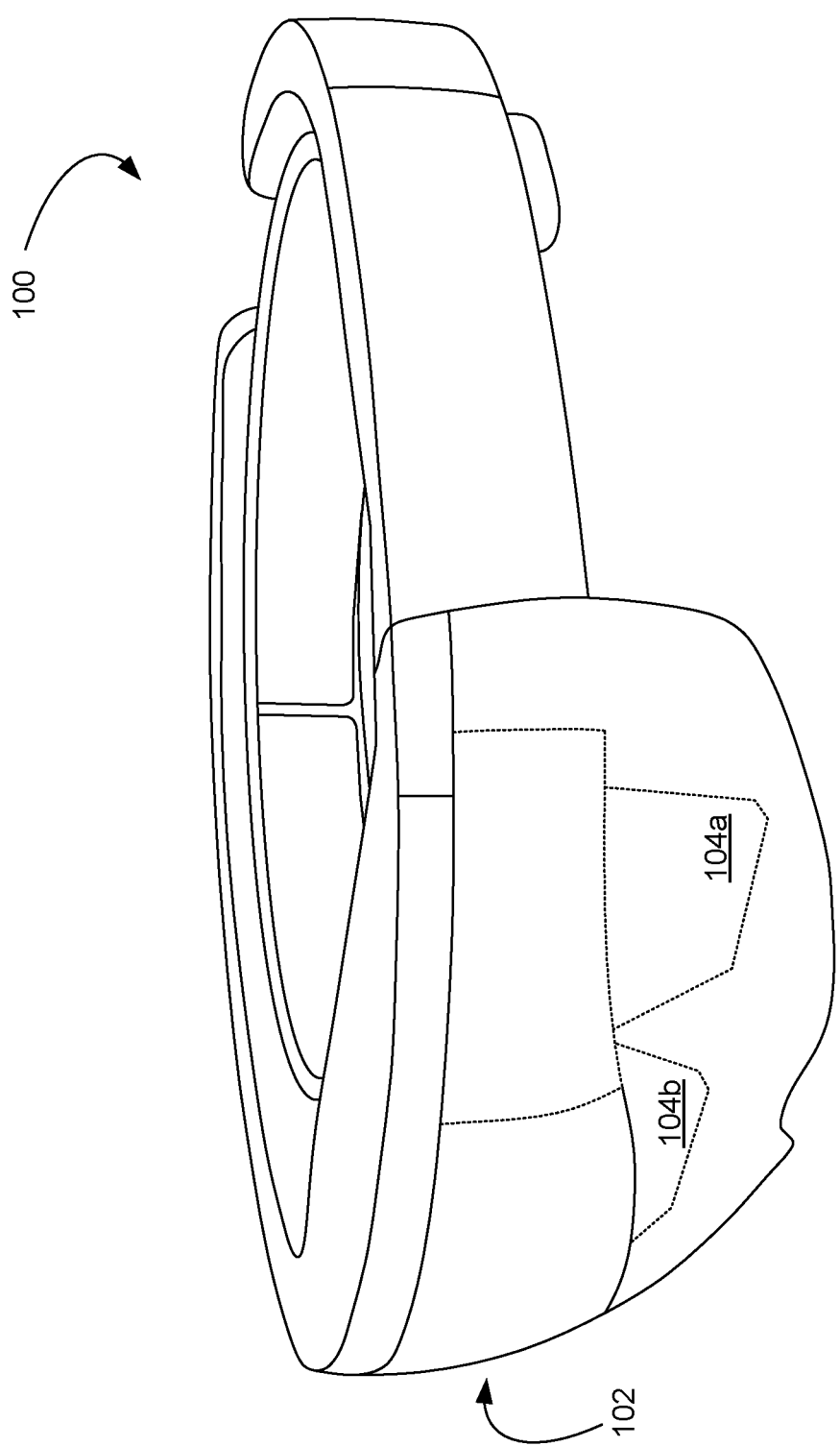
FIG. 1 shows an example head-mounted display device.

As mentioned above, a near-eye display device, such as a head-mounted display (HMD) device, may utilize a waveguide to display an image. In augmented reality display devices, the waveguide may permit the combined viewing of displayed virtual imagery and a real-world background. Such display devices may utilize a projector having a small exit pupil (e.g. on the order of 0.5 mm) to produce images for display. However, the use of a small pupil projector may not provide a sufficiently large eyebox (a region of space in which an entire displayed image is visible without vignetting) to accommodate a wide variety of interpupillary distances (IPDs) and possible pupil positions. For example, the human eye moves approximately 10 mm when gazing from the side to side. Where a same display device design is to accommodate people with both large and small interpupillary distances, the eyebox of the device may need to be even larger, such as 16 mm or even greater, to avoid vignetting when users with large or small IPDs move their eyes to the side of the field of view.

One possible solution may be to replicate the exit pupil via a waveguide having a turning grating with diagonal grating lines. Such gratings may be used to expand the exit pupil in both horizontal and vertical directions. However, such gratings may be sensitive to manufacturing variations, may cause light loss, and may require a relatively large waveguide surface area. For example, a variation as small as approximately 5 nm in grating depth over a grating region may create strong interference, which may result in color nonuniformities in a displayed image. A larger pupil projector also may be used to increase an exit pupil size, but may increase the device size.

The use of diffractive structures to expand an exit pupil further may reduce a field of view. Using separate waveguides to incouple and expand light of different wavelength bands (e.g. separate waveguides for red, green, and blue light) may help to address this. For example, a display device may include three planar waveguides in a "stacked" arrangement that each include wavelength-selective input gratings for coupling light of a certain wavelength band into the waveguide. However, a stacked arrangement increases device size and cost, and also may not greatly improve the field of view (e.g. field of view may be limited to 40°.

Further, in a planar waveguide, light corresponding to different directions of a field of view diverge. When these different directions of a field of view are not output to substantially the same location spatially, a user may not view each portion of the field of view together, but instead may perceive each portion separately as the user's pupil moves side-to-side, which may impact a user experience.

Accordingly, examples are disclosed that relate to expanding an exit pupil of a display device via a curved waveguide. Briefly, the disclosed examples expand an exit pupil of a light engine in a first dimension via pupil replication as the light propagates along a waveguide, and in a second dimension by a curved shape of the waveguide. The curvature of the waveguide effectively breaks the optical invariant that limits pupil expansion using geometrical optics. The curvature of the curved waveguide further helps to position exit pupils corresponding to different portions of a wide field of view at substantially a same location, thereby allowing an entire field of view of displayed virtual imagery to be viewed from a same eye position.

FIG. 1 shows an example head-mounted display system 100 including a display device 102 positioned near a wearer's eyes. The display device 102 includes left-eye and right-eye displays 104a, 104b each comprising see-through waveguides positioned to display virtual imagery in front of a view of a real-world environment for augmented and/or mixed reality applications. In other examples a display device may include a shared display extending over both eyes, rather than separate right and left eye displays. Further, in other examples, the displays 104a, 104b may comprise opaque world-facing surfaces (or otherwise block transmission of external light) for use in virtual reality applications.

Figure 2:
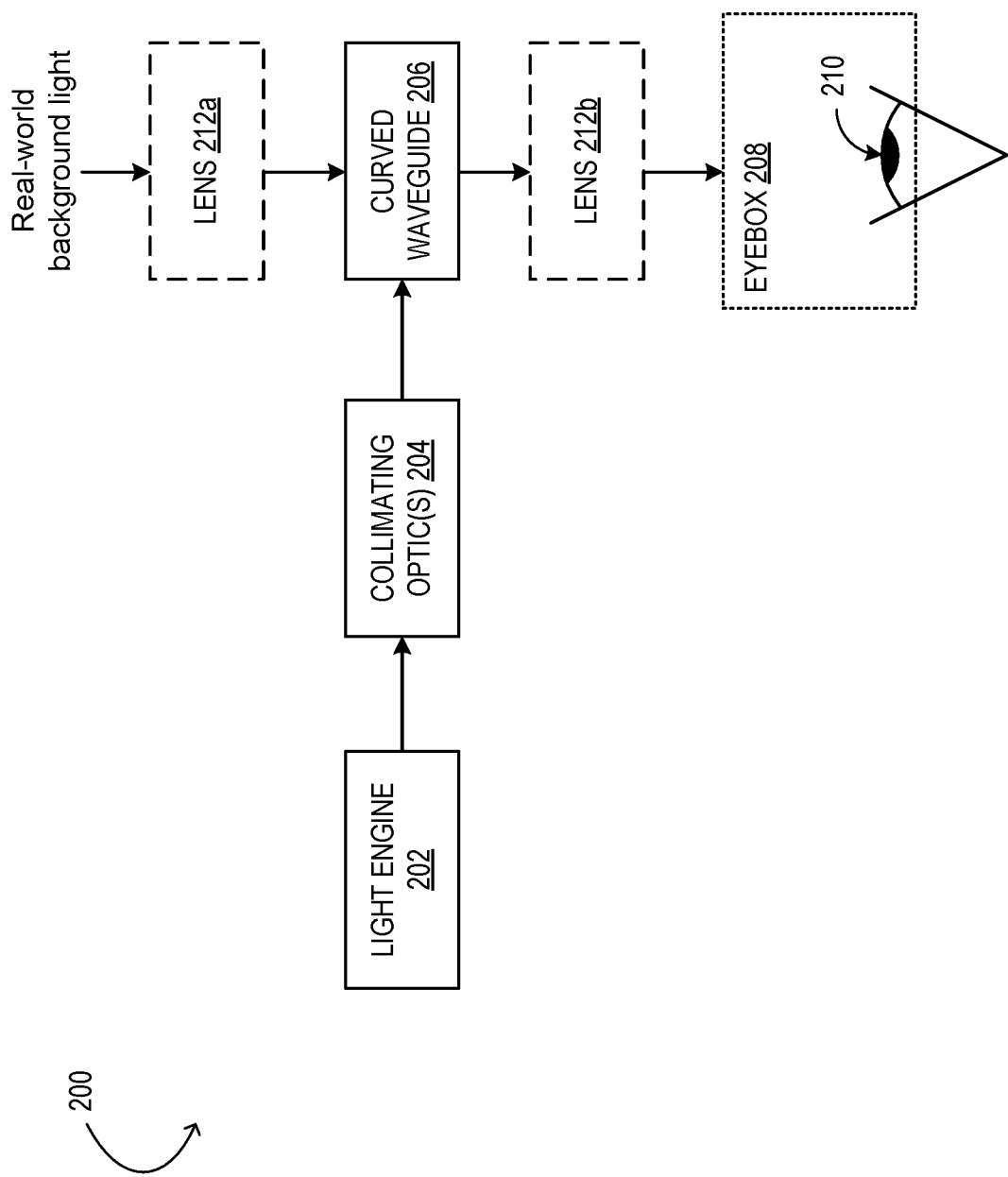
FIG. 2 shows a block diagram of an example display device.

FIG. 2 shows a block diagram of an example display device 200, which may be implemented as head-mounted display system 100. The display device 200 includes a light engine 202, a collimating optic 204, and a curved waveguide 206 configured to deliver images from the light engine 202 to an eyebox 208 in which a user's pupil 210 may be positioned for viewing. In some examples, the curved waveguide 206 is at least partially transparent, and may function as an optical combiner that combines virtual display imagery and real-world background imagery in the user's field of view. Further, in some examples, a lens 212 may be used to compensate for any distortion of the real-world background view due to viewing the real-world background through the waveguide. FIG. 2 illustrates to optional positions 212a and 212b at which a lens 212 may be positioned.

The curved waveguide 206 comprises a curvature in a direction transverse to an optical path between an input coupler and an output coupler. Further, a radius of the curvature varies along a direction extending between the input coupler and the output coupler. In some examples, a shape of the curved waveguide 206 may resemble a partial cone having a radius that increases from the input coupler toward the output coupler. The curvature of the curved waveguide 206 creates a lens effect, which expands an exit pupil of the light engine in a corresponding dimension.

Figure 3:
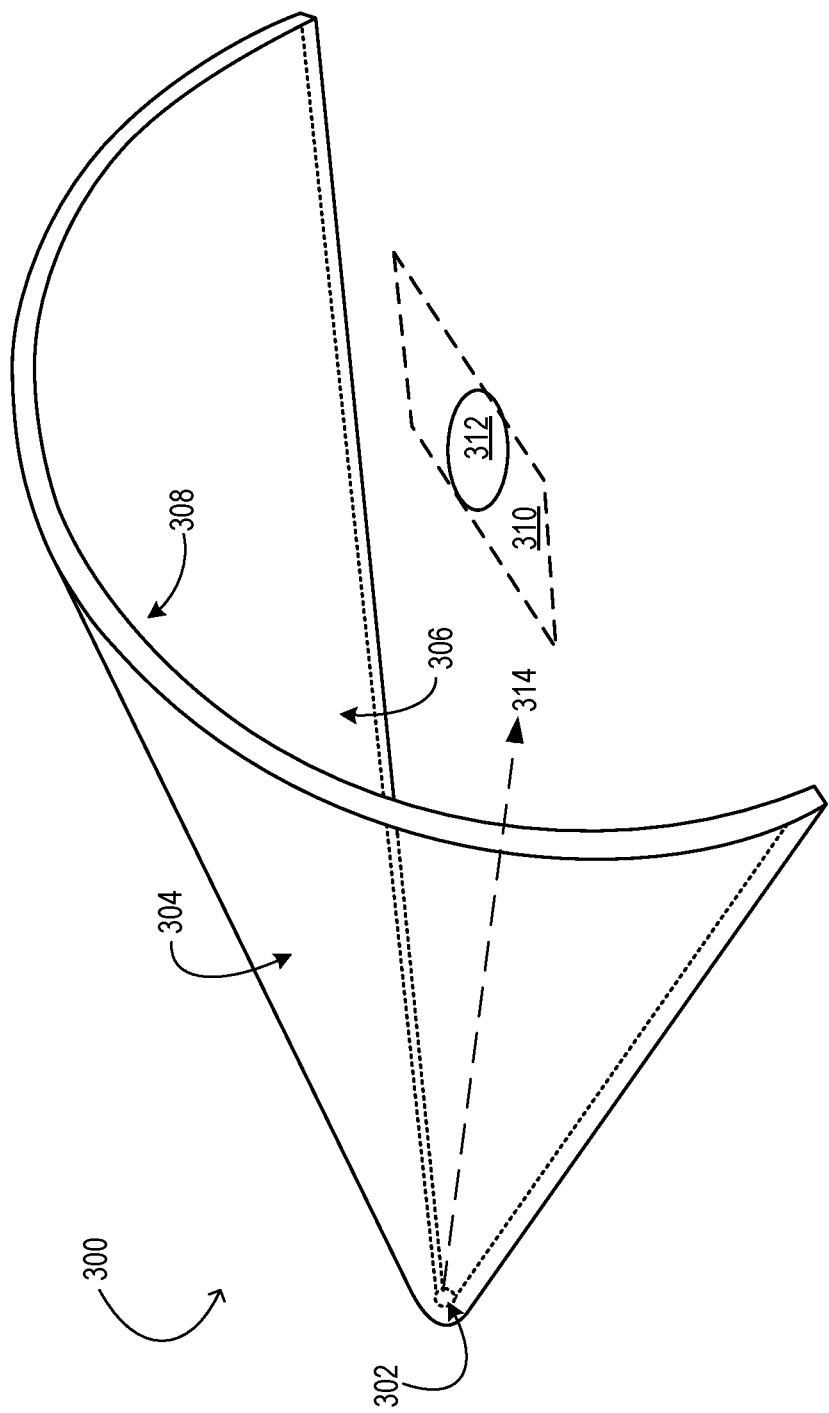
FIG. 3 shows a perspective view of an example curved waveguide.

FIG. 3 shows an example curved waveguide 300 that may be used as the curved waveguide 206 of FIG. 2. The curved waveguide 300 comprises an input coupler 302, a first reflective surface 304, an opposing second reflective surface 306, and an output coupler 308.

The input coupler 302 is located proximate to an end of the curved waveguide having a smaller radius. The input coupler 302 may utilize any suitable optical component to couple light into the curved waveguide 300, including but not limited to diffractive and reflective structures. In some examples, the input coupler 302 is configured to couple light of two or more wavelength bands into the curved waveguide 300, for example, via diffractive gratings having different grating properties (e.g. fill factor, slant, depth). In some such examples, different volume gratings configured to couple different wavelength bands of light into the curved waveguide 300 may be superimposed on top of one another to couple the light of two or more wavelength bands into the curved waveguide 300. Further, in some such examples, a single waveguide may be used for all three color bands of a color display. While depicted as being located at a world-facing surface 310 of the curved waveguide 300 in the example of FIG. 3, the input coupler 302 also may be located at an eye-facing surface 312, at an edge of the narrower end of the curved waveguide 300, or at any other suitable location. Further, in some examples, the input coupler 302 may comprise optical power.

Light coupled into the curved waveguide 300 is directed towards the second reflective surface 306, which reflects and redirects the light toward the first reflective surface 304, for example by total internal reflection (TIR). As the light propagates along the curved waveguide 300 toward the output coupler 308, the light repeatedly reflects from the first reflective surface 304 and the second reflective surface 306. This replicates an exit pupil of a light engine and effectively expands the exit pupil in a second dimension.

In some examples, one or both of the opposing reflective surfaces 304, 306 may comprise a coating. In some such examples, one or both of the opposing reflective surfaces 304, 306 may comprise an optically transparent cladding material comprising an index of refraction selected to provide a desired critical angle for TIR based upon an index of refraction of the material from which the waveguide is formed. In other examples, one or both of the opposing reflective surfaces 304, 306 may be at least partially coated with a multilayer dielectric coating configured to reflect one or more wavelengths of interest, such as red, green and/or blue wavelengths output by the light engine, and transmit other wavelengths. In yet other examples, the curved waveguide 300 may be uncoated. In each of these examples, the first reflective surface 304 and the second reflective surface 306 are at least partially transparent such that a real-world background image is viewable through the curved waveguide 300 in an augmented reality configuration. In further examples, a world-facing surface of the curved waveguide 300 may be opaque (e.g. coated with a metallic mirror layer) in a virtual reality configuration. In such an example, at least a portion of the inner-facing surface of the waveguide also may be coated with a reflective, opaque layer.

Figure 4:
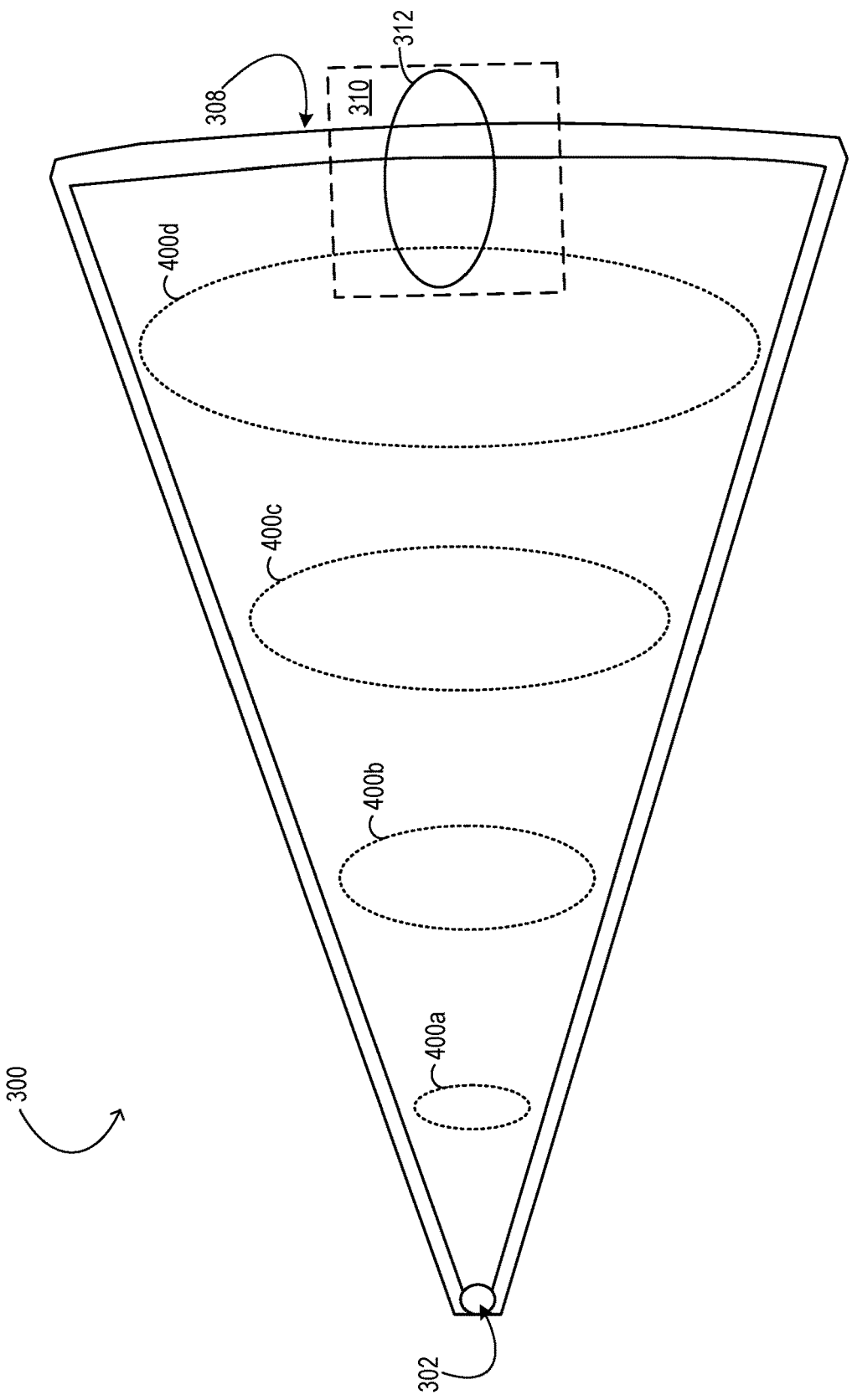
FIG. 4 shows a top view of the example curved waveguide of FIG. 3.

As mentioned above, the curvature of the curved waveguide 300 creates a lens effect which expands an exit pupil of the light engine in a dimension of the curvature. FIG. 4 schematically shows a top view of the curved waveguide 300 of FIG. 3, in which ellipses 400a-400d illustrate this expansion along a direction between the input coupler 302 and the output coupler 308.

Continuing with FIG. 3, the output coupler 308 couples the light out of the curved waveguide 300 and steers the light towards an eyebox 310. The output coupler 308 comprises any suitable structure configured to couple light out of the waveguide, including diffractive and reflective structures. In some examples, different gratings configured to couple different wavelength bands of light out of the curved waveguide 300 may be superimposed on top of one another to couple the light of two or more wavelength bands out of the curved waveguide 300. Additionally or alternatively, in some examples, the output coupler 308 may be chirped to further expand a field of view of a displayed image vertically and/or horizontally, for example, by varying a grating period of the output coupler 308. Changing a grating period locally at the output coupler 308 may change a direction of a field of the view of a displayed image, which may effectively expand the field of view. Further, in some examples, the output coupler 308 may comprise optical power.

In contrast to a planar waveguide in which different portions of a field of view diverge at an output coupler, the curved waveguide 300 as disclosed herein is configured to provide an output in which light corresponding to different portions of a field of view overlap within the eyebox 310. In this manner, exit pupils corresponding to different portions of a field of view (e.g. different field of view angles) may be sufficiently coincident in a viewing region, shown by an overlap region 312, that the different portions of the field of view are viewable at a same eye location. In the example of a head-mounted display device, this may help to prevent loss of imagery as a user moves their eyes from side-to-side, and also may provide a sufficiently large eyebox for users of varying interpupillary sizes.

In FIGS. 3 and 4, the radius of curvature comprises a gradient that is substantially constant along the direction extending between the input coupler 302 and the output coupler 308. In other examples, the curvature of the curved waveguide 300 may differ from that shown in FIGS. 3 and 4. For example, a radius of curvature of the curved waveguide 300 may comprise a gradient that varies along the direction extending between the input coupler 302 and the output coupler 308. As a more specific example, the curvature of the curved waveguide 300 may gradually flatten along the direction extending between the input coupler 302 and the output coupler 308.

In the example of FIG. 3, an axis 314 defining a center of curvature along the curved waveguide 300 is linear. In other examples, the axis 314 may comprise curvature, for example, to more closely fit a curvature of a human face. In a more specific example, the curve of this axis 314 may follow an Euler bend.

The curved waveguide 300 may be formed from any suitable material or combination of materials. Examples include poly(methyl methacrylate), polycarbonate, and cycloolefin polymer. Further, the curved waveguide 300 may be formed via any suitable process, including molding, casting, and/or thermoforming. In some examples, the curved waveguide 300 may comprise a uniform thickness, while in other examples, the thickness may vary along a length of and/or a curvature of the curved waveguide 300.

Returning to FIG. 2, the light engine 202 may utilize any suitable image-forming device. In various examples, the light engine 202 may comprise a liquid-crystal-on-silicon (LCOS) microdisplay, an organic light emitting device (OLED), or a scanning laser system. In some examples, each color field may utilize a separate image producing element (e.g. a separate LCOS or OLED), while in other examples a same image-forming device may be used to form different color fields.

As mentioned above, the curvature of the curved waveguide may exhibit a lensing effect with regard to a real-world background image. To compensate for this lensing effect, the display device 200 further may include a lens 212 that has an optical power substantially inverse to an optical power of the curved waveguide 206 with regard to a view of the real-world background through the curved waveguide 206. When included, the lens 212 may be positioned between the curved waveguide 206 and the user's pupil 210, as shown in FIG. 2, or alternatively may be positioned on an opposite side of the curved waveguide 206 as the user's pupil 210. In any example, the lens 212 may be selected to provide a substantially undistorted view of the real-world background. Further, in some examples, the lens 212 may be configured to compensate for vision deficiency of a user of the display device 200, for example, by having a specific eyeglass prescription for a user. It will be understood that the display device 200 may include additional optical elements not depicted in FIG. 2.

In some examples, aa curved waveguide 206 may introduce aberrations to an image received from the image engine. Thus, in some such examples, the display device 200 may be configured to pre-aberrate an image prior to introducing the image to the input coupler of the curved waveguide 206 to compensate for any waveguide-induced aberrations. This may be accomplished by encoding the aberrations into an image itself, for example by preprocessing an image prior to output by the light engine 202. In other examples, display optics positioned between the light engine 202 and the curved waveguide 206 also may be used to introduce compensatory aberrations.

The examples disclosed herein may help to provide for a compact waveguide configured to expand an exit pupil of a small pupil projector for multiple wavelength bands of light while maintaining a relatively wide field of view. Further, the curvature of the curved waveguide also may provide an aesthetically pleasing display device, akin to regular eyeglasses or sunglasses.

Another example provides a curved waveguide, comprising an input coupler configured to couple light into the curved waveguide, a first reflective surface, a second reflective surface opposing the first reflective surface, and an output coupler configured to couple the light out of the curved waveguide, the curved waveguide comprising a curvature in a direction transverse to an optical path between the input coupler and the output coupler, the curvature comprising a radius that varies along a direction extending between the input coupler and the output coupler. In such an example, one or more of the input coupler and/or the output coupler may additionally or alternatively comprise a diffractive structure having optical power. In such an example, the curved waveguide may additionally or alternatively comprise a uniform thickness. In such an example, the radius may additionally or alternatively comprise a gradient that varies along the direction extending between the input coupler and the output coupler. In such an example, an axis defining a center at any location along the curved waveguide may additionally or alternatively follow an Euler bend. In such an example, the curvature of the curved waveguide may additionally or alternatively be substantially flat at the output coupler. In such an example, the input coupler may additionally or alternatively be configured to couple light of two or more wavelength bands into the curved waveguide. In such an example, one or more of the input coupler and/or the output coupler may additionally or alternatively comprise two or more diffractive structures superimposed, each diffractive structure configured to couple light of a wavelength band into the curved waveguide.

Another example provides a head-mounted display device, comprising a light engine, a collimating optic positioned optically downstream of the light engine, and a curved waveguide comprising an input coupler configured to couple collimated light from the collimating optic into the waveguide, a first reflective surface, a second reflective surface opposing the first reflective surface, and an output coupler configured to outcouple light to an eyebox, the curved waveguide comprising a curvature in a direction transverse to an optical path between the input coupler and the output coupler, the curvature comprising a radius that varies along a direction extending between the input coupler and the output coupler. In such an example, the head-mounted display device may additionally or alternatively comprise optics configured to pre-aberrate an image prior to introducing the image to the input coupler. In such an example, the curved waveguide may additionally or alternatively be at least partially transparent such that a real-world background image is viewable through the curved waveguide. In such an example, the head-mounted display device may additionally or alternatively comprise a lens, an optical power of the lens being inverse to an optical power of the curved waveguide with regard to the real-world background image. In such an example, the curved waveguide may additionally or alternatively comprise a uniform thickness. In such an example, the radius may additionally or alternatively comprise a gradient that varies along the direction extending between the input coupler and the output coupler. In such an example, an axis defining a center at any location along the curved waveguide may additionally or alternatively follow an Euler bend. In such an example, the curvature of the curved waveguide may additionally or alternatively be substantially flat at the output coupler. In such an example, the input coupler may additionally or alternatively be configured to couple light of two or more wavelength bands into the curved waveguide. In such an example, the output coupler may additionally or alternatively be configured to outcouple light corresponding to different portions of a field of view such the different portions of the field of view are viewable at a same pupil location.

Another example provides a display device, comprising a light engine, a curved waveguide comprising an input coupler configured to couple a pupil output by the light engine into the waveguide, an output coupler configured to outcouple light to a viewing region, and a first reflective surface and a second reflective surface opposing the first reflective surface, the first reflective surface and the second reflective surface configured to replicate the pupil as the pupil propagates along a direction extending between the input coupler and the output coupler, the curved waveguide comprising a curvature in a direction transverse to an optical path between the input coupler and the output coupler, the curvature comprising a radius that varies along a direction extending between the input coupler and the output coupler, and the display device also comprising a lens comprising an optical power configured to compensate for an optical power of the waveguide with respect to a real-world background image. In such an example, the optical power of the lens may additionally or alternatively be configured to compensate for a vision deficiency of a user.

It will be understood that the configurations and/or approaches described herein are illustrative in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A curved waveguide, comprising:
an input coupler configured to couple light from a light engine into the curved waveguide;
a first reflective surface;
a second reflective surface opposing the first reflective surface; and
an output coupler configured to couple the light out of the curved waveguide, the curved waveguide comprising a curvature in a dimension transverse to an optical path between the input coupler and the output coupler, the curvature comprising a radius that increases along a direction extending from the input coupler toward the output coupler, wherein the curvature is configured to create a lens effect such that the light within the curved waveguide from the light engine and an exit pupil of the light engine are expanded along the dimension transverse to the optical path.

2. The curved waveguide of claim 1, wherein one or more of the input coupler and/or the output coupler comprises a diffractive structure having optical power.

3. The curved waveguide of claim 1, wherein the curved waveguide comprises a uniform thickness.

4. The curved waveguide of claim 1, wherein the radius comprises a gradient that increases along the direction extending from the input coupler toward the output coupler.

5. The curved waveguide of claim 1, wherein an axis defining a center at any location along the curved waveguide follows an Euler bend.

6. The curved waveguide of claim 1, wherein the curvature of the curved waveguide is substantially flat at the output coupler.

7. The curved waveguide of claim 1, wherein the input coupler is configured to couple light of two or more wavelength bands into the curved waveguide.

8. The curved waveguide of claim 7, wherein one or more of the input coupler and the output coupler comprises two or more diffractive structures superimposed, each diffractive structure configured to couple light of a wavelength band.

9. The curved waveguide of claim 1, wherein the curved waveguide forms a partial cone.

10. The curved waveguide of claim 9, wherein the direction between the input coupler and the output coupler is uncurved.

11. A head-mounted display device, comprising:
a light engine comprising an exit pupil; and
a curved waveguide positioned to receive light from the light engine, the curved waveguide comprising
an input coupler configured to couple light from the light engine into the waveguide,
a first reflective surface,
a second reflective surface opposing the first reflective surface, and
an output coupler configured to outcouple light to an eyebox, the curved waveguide comprising a curvature in a direction transverse to an optical path between the input coupler and the output coupler, the curvature comprising a radius that increases along a direction extending from the input coupler toward the output coupler and the curvature being configured to create a lens effect such that the light within the curved waveguide from the light engine and the exit pupil of the light engine are expanded along the direction transverse to the optical path.

12. The head-mounted display device of claim 11, further comprising optics configured to pre-aberrate an image prior to introducing the image to the input coupler.

13. The head-mounted display device of claim 11, wherein the curved waveguide is at least partially transparent such that a real-world background image is viewable through the curved waveguide.

14. The head-mounted display device of claim 13, further comprising a lens, an optical power of the lens being inverse to an optical power of the curved waveguide with regard to the real-world background image.

15. The head-mounted display device of claim 11, wherein the radius comprises a gradient that increases along the direction extending from the input coupler toward the output coupler.

16. The head-mounted display device of claim 11, wherein an axis defining a center at any location along the curved waveguide follows an Euler bend.

17. The head-mounted display device of claim 11, wherein the input coupler is configured to couple light of two or more wavelength bands into the curved waveguide.

18. The head-mounted display device of claim 11, wherein the output coupler is configured to outcouple light corresponding to different portions of a field of view such the different portions of the field of view are viewable at a same pupil location.

19. A display device, comprising:
a light engine comprising an exit pupil;
a curved waveguide comprising
an input coupler configured to couple light output by the light engine into the curved waveguide,
an output coupler configured to outcouple light to a viewing region, and
a first reflective surface and a second reflective surface opposing the first reflective surface, the first reflective surface and the second reflective surface configured to replicate the exit pupil as the exit pupil propagates along a direction extending between the input coupler and the output coupler, the curved waveguide comprising a curvature in a dimension transverse to an optical path between the input coupler and the output coupler, the curvature comprising a radius that increases along a direction extending from the input coupler toward the output coupler to expand the exit pupil along the dimension transverse to the optical path by creating a lensing effect that expands the light within the curved waveguide from the light engine and the exit pupil of the light engine; and a lens comprising an optical power configured to compensate for an optical power of the curved waveguide with respect to a real-world background image.

20. The display device of claim 19, wherein the optical power of the lens is further configured to compensate for a vision deficiency of a user.

* * * * *